Patented May 26, 1953

2,640,059

UNITED STATES PATENT OFFICE 2,640,059

METHOD OF PREPARING HYDROXYALKYL-THIO ANTHRAQUINONES

Victor S. Salvin, Irvington, and Edward F. Landau, Newark, N. J., assignors to Celanese Corporation of America, New York, N. Y., a corporation of Delaware No Drawing. Application July 20, 1949, Serial No. 105,894

7 Claims. (Cl. 260—371)

1

This invention relates to the preparation of anthraquinones and relates more particularly to the preparation of anthraquinones containing a hydroxyalkylthio group in the beta position.

As is well known, it has heretofore been the practice to employ a multi-stage process for introducing a hydroxyalkylthio group into the beta position of an anthraquinone compound. For example, it has been proposed to react an anthraquinone compound containing a bromine atom or sulfonic acid group in the beta position with sodium hydrosulfide to replace the bromine atom or sulfonic acid group with a mercapto group, following which the mercapto group is etherified with a glycol chlorhydrin. Since each step in this process operates at an efficiency below theoretical, the overall yield is low. In addition, there is a considerable expense involved in carrying out a multi-stage process of this type, thus increasing the cost of the final product.

It is an important object of this invention to provide a process for preparing anthraquinone compounds containing a hydroxyalkylthio group in the beta position which will be free from the foregoing and other disadvantages of the processes hitherto employed for this purpose.

A further object of this invention is the provision of a process for preparing anthraquinone compounds containing a hydroxyalkylthio group in the beta position by reacting an anthraquinone containing a sulfonic acid group in the beta position with a mercapto alkyl alcohol.

Another object of this invention is to provide novel anthraquinone compounds containing a hydroxyalkylthio group in the beta position.

Other objects of our invention will be apparent from the following detailed description and claims.

In accordance with our invention, an anthraquinone compound of the following general formula

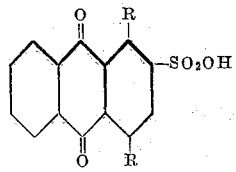

wherein R is Br, OH, $NH_2$, $NHR_1$ or $NHSO_2R_1$, with at least one R being $NH_2$ or $NHR_1$, and $R_1$ is alkyl or aryl, is reacted in an alkaline medium with a mercapto alkyl alcohol. Suitable mercapto alkyl alcohols are, for example 2-mercapto ethanol, 3-mercapto-1-propanol and 4-mercapto-1-butanol.

2

In carrying out this reaction, from about 1 to 5 mols of the mercapto alkyl alcohol are mixed with 1 mol of the anthraquinone and a suitable alkaline agent such as, for example, sodium hydroxide or potassium hydroxide, in the presence of an inert liquid medium such as water, and the mixture so formed maintained at an elevated temperature of from about 90 to 105° C. until the reaction is complete, say for about 3.5 to 8 hours. The reaction mixture is then cooled and filtered or otherwise treated to separate therefrom the anthraquinone containing a hydroxyalkylthio group in the beta position. When an anthraquinone containing a bromine atom in the alpha position is employed as the starting material, this bromine atom will also be replaced by a hydroxyalkylthio group to produce an anthraquinone containing said hydroxyalkylthio group in both the alpha and beta positions.

The following examples are given to illustrate this invention further.

Example I

A mixture of 20.8 parts by weight of 1-amino-2-sulfonic acid-4-anilino-anthraquinone, 6 parts by weight of 2-mercapto ethanol, 50 parts by weight of a 2 normal aqueous potassium hydroxide solution, and 1000 parts by weight of water are entered into a reaction vessel equipped with a reflux condenser and stirrer. The mixture is heated to reflux (100° C.) with stirring for 6 hours, following which it is cooled and filtered. The filter cake is washed successively with 5000 parts by weight of a 3% by weight aqueous sodium hydroxide solution, 1000 parts by weight of water, 500 parts by weight of 5% hydrochloric acid and 1000 parts by weight of water. The filter cake is then slurried in 180 parts by weight of 50% ethanol, filtered and dried. There are obtained 18 parts by weight, or 82% of theoretical of the compound 1-amino-2-hydroxyethylthio-4-anilino-anthraquinone.

Example II

A mixture of 7.5 parts by weight of 1-amino-2-sulfonic acid-4-brom-anthraquinone, 10 parts by weight of 2-mercapto ethanol, 50 parts by weight of a 10% aqueous sodium hydroxide solution, and 500 parts by weight of water are entered into a reaction vessel equipped with a reflux condenser and stirrer. The mixture is heated to reflux (100° C.) with stirring for 6 hours, following which it is cooled and filtered, and the filter cake washed in the manner set forth in Example I. There are obtained 5 parts by weight or 67% of theoretical of the compound 1-amino-2,4-di-hydroxyethylthio-anthraquinone. This compound dyes cellulose acetate and other organic derivative of cellulose materials in valuable red shades.

*Example III*

A mixture of 10 parts by weight of 1-amino-2-sulfonic acid-4-p-toluene sulfonamide-anthraquinone, 10 parts by weight of 2-mercapto ethanol, 50 parts by weight of a 10% aqueous sodium hydroxide solution, and 500 parts by weight of water are entered into a reaction vessel equipped with a reflux condenser and stirrer. The mixture is heated to reflux (100° C.) with stirring for 5 hours, following which it is cooled and filtered, and the filter cake washed in the manner set forth in Example I. There are obtained 6.3 parts by weight or 64% of theoretical of the compound 1-amino-2-hydroxyethylthio-4-p-toluene sulfonamide-anthraquinone. This compound is a valuable intermediate for the production of anthraquinone dyes containing a hydroxyalkylthio group in the beta position.

*Example IV*

A mixture of 1,5-dihydroxy-2-sulfonic acid-4,8-diamino-anthraquinone, 2-mercaptoethanol, a 50% aqueous sodium hydroxide solution and water are entered into a reaction vessel equipped with a stirrer and a reflux condenser. The mixture is heated to reflux (100–105° C.) with stirring for 5 hours following which it is cooled and filtered. There is obtained the compound 1,5-dihydroxy - 2 - hydroxyethylthio-4,8-diamino-anthraquinone. This compound dyes cellulose acetate and other organic derivative of cellulose materials in valuable blue shades.

It is to be understood that the foregoing detailed description is given merely by way of illustration and that many variations may be made therein without departing from the spirit of our invention.

Having described our invention, what we desire to secure by Letters Patent is:

1. Process for preparing hydroxyalkylthio anthraquinones which comprises reacting an anthraquinone of the following general formula

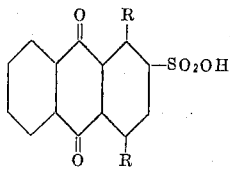

wherein R is a member of the group consisting of Br, OH, $NH_2$, $NHR_1$ and $NHSO_2R_1$, with at least one R being $NH_2$ or $NHR_1$, and $R_1$ is a member of the group consisting of alkyl and aryl with a mercapto alkyl alcohol.

2. Process for preparing hydroxyalkylthio anthraquinones which comprises reacting 1 mol of an anthraquinone of the following general formula

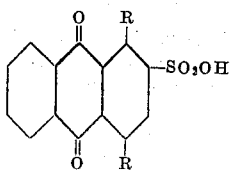

wherein R is a member of the group consisting of Br, OH, $NH_2$, $NHR_1$, and $NHSO_2R_1$, with at least one R being $NH_2$ or $NHR_1$, and $R_1$ is a member of the group consisting of alkyl and aryl with from about 1 to 5 mols of a mercapto alkyl alcohol.

3. Process for preparing hydroxyalkylthio anthraquinones which comprises reacting 1 mol of an anthraquinone of the following general formula

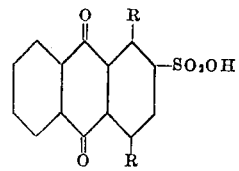

wherein R is a member of the group consisting of Br, OH, $NH_2$, $NHR_1$, and $NHSO_2R_1$, with at least one R being $NH_2$ or $NHR_1$, and $R_1$ is a member of the group consisting of alkyl and aryl with from about 1 to 5 mols of a mercapto alkyl alcohol at a temperature of from about 90 to 105° C.

4. Process for preparing hydroxyalkylthio anthraquinones which comprises reacting 1 mol of an anthraquinone of the following general formula

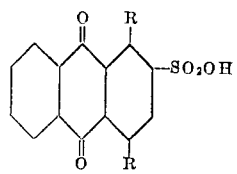

wherein R is a member of the group consisting of Br, OH, $NH_2$, $NHR_1$, and $NHSO_2R_1$, with at least one R being $NH_2$ or $NHR_1$, and $R_1$ is a member of the group consisting of alkyl and aryl with from about 1 to 5 mols of a mercapto alkyl alcohol at a temperature of from about 90 to 105° C. for about 3.5 to 8 hours.

5. Process for preparing a hydroxyalkylthio anthraquinone which comprises reacting 1-amino-2-sulfonic acid-4-anilino anthraquinone with 2-mercapto ethanol.

6. Process for preparing a hydroxyalkylthio anthraquinone which comprises reacting 1-amino-2-sulfonic acid-4-p-toluene sulfonamide-anthraquinone with 2-mercapto ethanol.

7. Process for preparing a hydroxyalkylthio anthraquinone which comprises reacting 1-amino - 2-sulfonic acid-4-brom-anthraquinone with 2-mercapto ethanol.

VICTOR S. SALVIN.
EDWARD F. LANDAU.

References Cited in the file of this patent

UNITED STATES PATENTS

| Number | Name | Date |
|---|---|---|
| 1,710,992 | Kranzlein et al. | Apr. 30, 1929 |
| 2,117,569 | Peter | May 17, 1938 |
| 2,434,765 | Grossmann | Jan. 20, 1948 |

FOREIGN PATENTS

| Number | Country | Date |
|---|---|---|
| 359,397 | Great Britain | Oct. 14, 1931 |

OTHER REFERENCES

Lowy et al., Introduction to Organic Chemistry, p. 213–214 (1946), John Wiley and Sons, New York.